July 11, 1950
H. B. SIEMS
2,515,165
CONVEYING AND RASPING EQUIPMENT FOR LUMPY MATERIAL
SUCH AS SUPERPHOSPHATE AND THE LIKE
Filed May 18, 1945
2 Sheets-Sheet 1
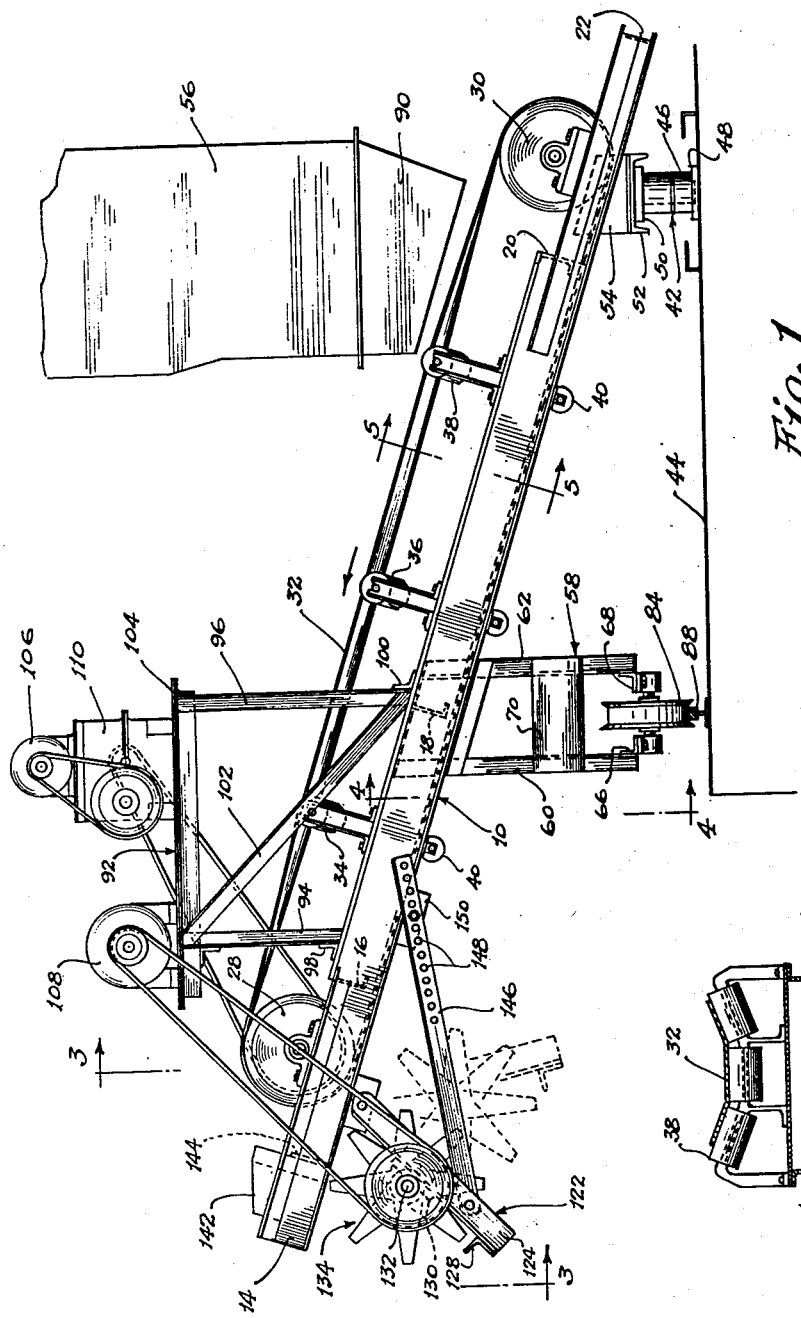
INVENTOR.
Herman B. Siems
BY
R. G. Story
ATTORNEY July 11, 1950 H. B. SIEMS 2,515,165
CONVEYING AND RASPING EQUIPMENT FOR LUMPY MATERIAL
SUCH AS SUPERPHOSPHATE AND THE LIKE
Filed May 18, 1945 2 Sheets-Sheet 2
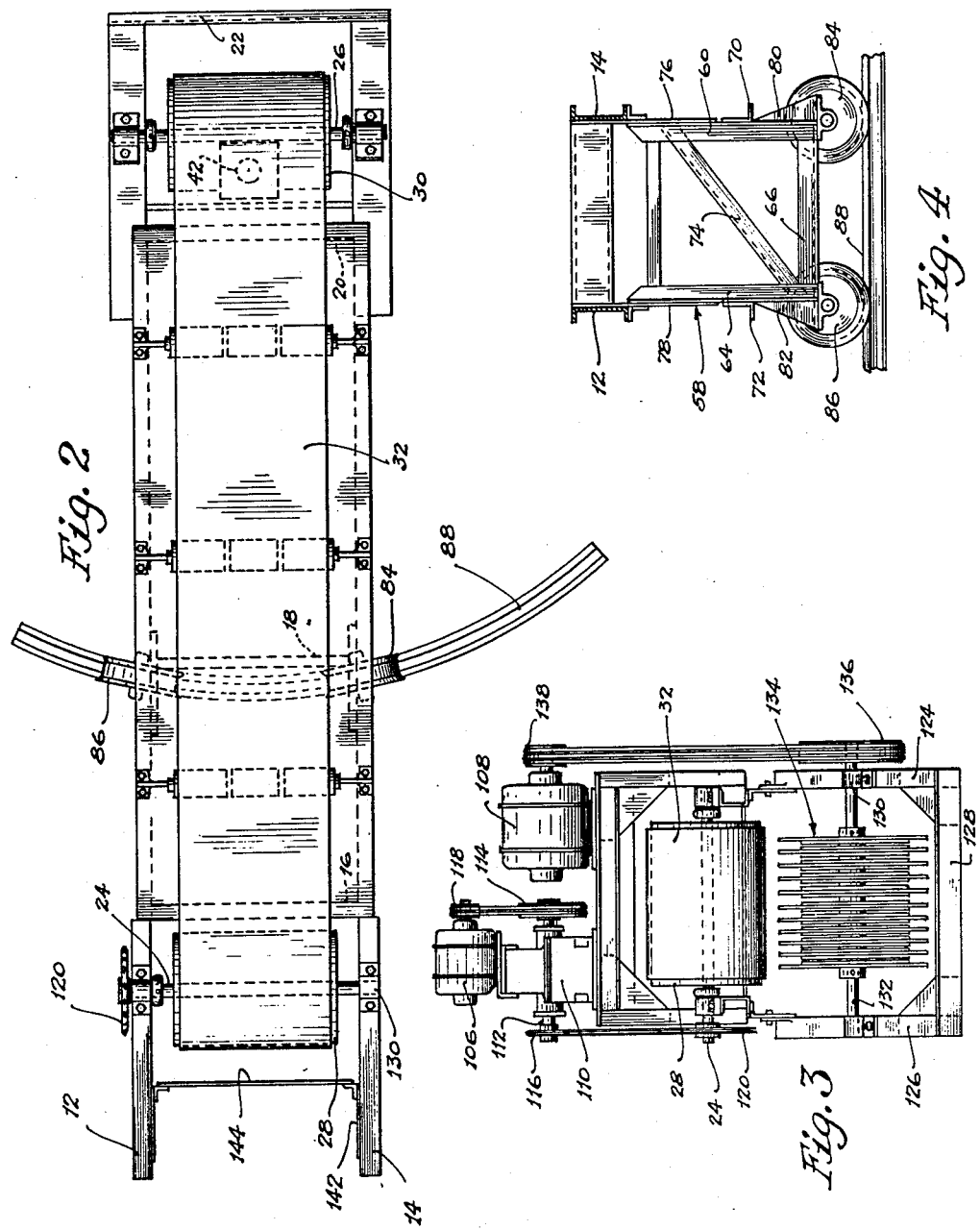
INVENTOR.
Herman B. Siems
BY
R. G. Story
ATTORNEY Patented July 11, 1950

2,515,165

UNITED STATES PATENT OFFICE 2,515,165

CONVEYING AND RASPING EQUIPMENT FOR LUMPY MATERIAL SUCH AS SUPERPHOSPHATE AND THE LIKE

Herman B. Siems, Chicago, Ill., assignor to Swift & Company, Chicago, Ill., a corporation of Illinois Application May 18, 1945, Serial No. 594,463

5 Claims. (Cl. 241—186)

This invention relates to improvements in material handling equipment and has particular reference to conveyor and rasper equipment for handling lump material such as superphosphate used in the manufacture of fertilizer.

While belt conveyors are commonly used for material handling purposes the application for which the mechanism of this invention was designed involved a number of problems for which previously known conveyor belt devices offered no adequate solution.

For example, the contemplated installation required freedom of movement of at least one end of the conveyor in lateral directions for distribution of the material and rasping of the material while still in motion from the conveyor in addition the usual functions of belt conveyor mechanism.

It is therefore an object of the present invention to provide a combined conveying and rasping device for lump material.

A further object resides in the provision of a combined conveying and rasping device constructed as a unit and so supported that at least one end of the device will have freedom of lateral or swinging movement.

A still further object resides in the provision of an improved conveying device for lump material having adjustable lump rasping mechanism operatively associated with the discharge end thereof.

Another object of the invention is to provide a slowly moving belt conveyor whereby wear and tear is reduced and yet the product discharged from the end of the conveyor is thrown a considerable distance from the conveyor.

Another object is to provide a non-clogging rasper adapted to operate on plastic materials such as fresh superphosphate.

Other objects and advantages will become apparent as the description proceeds in connection with the accompanying drawings and from the appended claims.

In the manufacture of superphosphate in a continuous or traveling den, it has been customary heretofore to discharge the acid treated rock onto a moving den which travels in a fixed path. Also it has been customary to provide a rasper at the end and separate from the conveyor to rasp the fresh, plastic superphosphate formed by the reaction of the acid on the rock as the mixture travels on the conveyor. The fresh superphosphate is plastic and would tend to form a cake or large lumps unless it is rasped as it is discharged from the conveyor. The rasped material is ordinarily discharged from the conveyor into a large bin or chamber. While a stationary rasper as used heretofore throws the rasped material a considerable distance nevertheless the material tends to form a pile and it has been necessary to use a crane or other means of distributing the rasped superphosphate in the bin.

The present invention provides a free swinging or traveling conveyor which contains a rasper as an integral part thereof. Thus the conveyor is pivoted at the one end where the acid treated rock is charged. The other end where the superphosphate is discharged is free swinging and contains the rasper attached thereto. The conveyor travels at a relatively slow speed and the rasper travels at a relatively high speed, for example 400 R. P. M. The arrangement is such that the slow movement of the conveyor causes little wear and tear thereon. However the high speed rasper effectively throws the material discharged from the conveyor a considerable distance in the bin. Also the movement of the free swinging end of the conveyor with the attached rasper enables the rasped material to be distributed substantially evenly in the bin.

In the accompanying drawings in which like reference numerals are used to designate similar parts throughout:

Figure 1 is a side elevational view of a combined conveying and rasping device constructed according to the invention;

Figure 2 is a top plan view of the conveying mechanism, the motor platform and rasping mechanism being omitted in order to simplify the drawing;

Figure 3 is a sectional view on the line 3—3 of Figure 1;

Figure 4 is a sectional view on the line 4—4 of Figure 1; and

Figure 5 is a diagrammatic sectional view on the line 5—5 of Figure 1.

With continued reference to the drawings and particularly to Fig. 1, numeral 10 generally indicates a conveyor frame which comprises a pair of side members as indicated at 12 and 14 in Fig. 2 and a plurality of cross members as indicated at 16, 18, 20 and 22.

The frame is provided on its upper side with suitable bearing brackets in which are journaled the axles 24 and 26 of a pair of belt pulleys 28 and 30, and an endless conveyor belt 32 extends around the belt pulleys 28 and 30 and is supported along its upper side by a plurality of sets of rollers as indicated at 34, 36 and 38. These sets of rollers, as particularly illustrated in Fig. 5, each comprise three rollers of which the center roller has its axis substantially parallel to the axes of the belt pulleys and the end rollers are inclined outwardly and upwardly to give the upper side of the belt a trough shape as is clearly indicated in Fig. 5. The bottom side of the belt is preferably supported by one or more straight return rolls as indicated at 40. The belt itself may be of some usual or preferred construction but in the case of the installation for which the device of the invention was particularly designed and in which lump phosphate rock was the material to be handled, it was found that a belt composed of cord fabric and neoprene proved to be entirely satisfactory.

The frame 10 is inclined, as is clearly illustrated in Fig. 1, and the lower end portion of the frame is supported upon a vertical pivot 42 fixed to the floor 44. While the construction of the vertical pivot 42 may be varied without in any way exceeding the scope of the invention, it has been found convenient to use for this purpose a member 46 having an axial bore therethrough and having at one end an integral flange 48 by means of which the member can be firmly secured to the floor 44 by suitable means such as bolts or screws. A second member comprises a cylindrical stem extending into the bore of the member 46 and an integral flange 50 which bears upon the top surface of the member 46 and is secured to a transverse member 52 which is in turn secured at its ends to the frame side members 12 and 14 by suitable plates or gussets 54. This pivot is so located that its axis substantially coincides with the center line of a hopper or chute 56 through which the material to be handled is discharged onto the upper surface of the belt 32.

Intermediate its length the frame is provided with a depending portion generally indicated at 58 which may conveniently comprise four vertical leg members, three of which are indicated at 60, 62, and 64 in Figs. 1 and 4. These vertical leg members are secured together at their lower ends by suitable cross members, as indicated at 66 and 68, and by side members, as indicated at 70 and 72. The structure is preferably reinforced by a diagonal member 74 and by suitable gusset plates, as indicated at 76, 78, 80 and 82 in Fig. 4, to provide a strong and rigid unit firmly secured to the frame side members 12 and 14.

At its lower end the frame portion 58 carries a pair of trunnion wheels 84 and 86 adapted to ride upon an arcuate track 88 which is formed from a rail curved on an arc centered upon the axis of the vertical pivot 42, as is clearly illustrated in Fig. 2.

With this arrangement the higher end of the inclined conveyor unit, which is the discharge end of the unit, may be swung about the pivot 42 in order to distribute material discharged from the conveyor along a path which is generally transverse to the direction of movement of the material by the conveyor. By having the axis of the pivot 42 substantially coincident with the center line of the hopper 56 this swinging movement may take place without moving the belt out from under the discharge end of the hopper. In order to make sure that the material discharged from the hopper will all stay on the conveyor belt the bottom end of the hopper or chute 56 is provided with skirt boards, as indicated at 90 in Fig. 1.

On its upper side the frame carries a motor platform, generally indicated at 92, which may be conveniently provided by securing four vertical legs, two of which are indicated at 94 and 96 in Fig. 1, to the upper sides of the side frame members 12 and 14. These legs may be secured to the side members by suitable means, such as the transverse angle bars 98 and 100, and may be reinforced by suitable diagonal members, one of which is indicated at 102. On their upper ends the four upwardly extending vertical leg members carry a platform 104 upon which two motors 106 and 108 are secured. A reduction gear box 110 is interposed between the platform and the motor 106. The gear box 110 has an input sheave 114 on one side thereof, and output shaft 112 carries an output sprocket 116 positioned to the other side of the gear box. The motor shaft is provided with a sheave 118 which is connected to the sheave 114 by suitable means such as a plurality of V-belts. The chain sprocket 116 is connected by a suitable roller chain with a chain sprocket 120 secured on the end of the axle 24 of the belt pulley 28 so that the motor 106 by rotating the belt pulley 28 drives the conveyor belt 32. The belt sheave 114 is larger than the sheave 118 and the chain sprocket 120 is larger than the sprocket 116 thus giving a double speed reduction, in addition to that obtained in gear box 110 between the motor and the belt pulley 28, to reduce the rotational speed of the pulley relative to the rotational speed of the motor.

A depending truss structure, generally indicated at 122, is pivotally secured at its upper end to the under sides of the side members 12 and 14 at a location adjacent the belt pulley 28. This truss structure may conveniently comprise a pair of leg members 124 and 126 secured together at their free ends by a cross member 128 and reinforced by suitable gusset plates, as indicated in Figs. 1 and 3. Intermediate its length the truss 122 is provided with a pair of bearing brackets, one of which is indicated at 130 in Fig. 1, in which is journaled the axle 132 of a rasper cylinder, generally indicated at 134. This axle 132 carries upon one end thereof a belt sheave 136 operatively connected by suitable means, such as a plurality of V-belts, with a sheave 138 on the shaft of the motor 108 so that the motor 108 is operative to drive the rasper cylinder 134.

The rasper cylinder 134 is formed of a plurality of diametrically disposed blade members, as indicated at 140, each of which has a somewhat enlarged central portions apertured for the passage therethrough of the axle shaft 132 and reduced, generally symmetrical end portions. These blade members are mounted upon the axle 132 in side-by-side relation, and are sequentially angularly spaced by a substantially uniform angle forming pocket-like openings therebetween as is clearly indicated in Fig. 1. In practice it has been found that an angle of 45° between the center lines of adjacent blade members provides an efficient and effective rasper cylinder.

The side members 12 and 14 extend outwardly beyond the discharge end of the conveyor belt and carry upon their outwardly extended end portions respective bracket members, one of which is indicated at 142 in Fig. 1. These bracket members are adjustably secured to the respective side members 12 and 14 and support a transverse blade member 144 which is adjustably secured to the surfaces of the bracket members which are at right angles to the side members 12 and 14 so that the blade member can be moved substantially horizontally along the side members and can also be moved substantially vertically along the bracket members giving it two paths of adjustment substantially at right angles to each other. The rasper cylinder 134 cooperates with the blade member 144 to reduce the maximum lump size of material falling from the discharge end of the conveyor belt. As is clearly indicated in Fig. 1 the rasper cylinder is so disposed as to lie within the path or trajectory of the material falling from the discharge end of the conveyor belt over the pulley 28, this position being obtained by proper adjustment of the pivoted brace members, one of which is indicated at 146, and each of which is pivotally connected at one end to a corresponding strut member and is provided in its opposite end portion with a plurality of spaced apertures, as indicated at 148, through which the brace member may be adjustably pinned to corresponding apertured block 150 secured on the under side of the corresponding side member 12 or 14.

As the rasper cylinder is rotated in the path of the falling material from the discharge end of the conveyor belt it picks this material up and carries it past the blade 144. Any material that is small enough to fall in to the spaces between the blade elements of the rasper cylinder is not affected, but larger lumps of material are crushed against the blade 144 and their size reduced until they will fall into the spaces between the cylinder blade elements and thus be carried past the transverse blade 144. Because of the speed of rotation of the cylinder 134 the material carried past the transverse blade is thrown somewhat upwardly and outwardly beyond the end of the conveyor frame, thus materially decreasing the necessary length of the conveyor mechanism.

There is thus provided an efficient and economical conveyor unit, the discharge end of which can be moved laterally to properly distribute material handled thereby and with which there is combined a lump sizing or rasper mechanism so that the material is moved and sized in a single operation. By means of the adjustable features of the sizer mechanism the maximum lump size can be varied at will and by the provision of separate motors for driving the conveyor belt and the rasper cylinder of the sizing mechanism a considerable economy in the use of electrical energy is obtained since the sizing mechanism requires considerably more power than is required to drive the conveyor belt. Other material advantages of the improved construction will be readily apparent to those skilled in the art.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and language of equivalency of the claims are therefore intended to be embraced therein.

Obviously, many modifications and variations of the invention hereinbefore set forth may be made without departing from the spirit and scope thereof, and, therefore, only such limitations should be imposed as are indicated in the appended claims.

I claim:

1. A rasping and distributing means for fresh superphosphate, comprising: a conveyor mounted on a frame and having an inlet end to receive superphosphate and an outlet end to deliver superphosphate to a rasper; a pair of swinging arms mounted on the frame at the outlet end of said conveyor; a rasping means taking the form of a plurality of radially extending fingers, said rasping means being carried on an axle supported at each end in the free ends of said pair of swinging arms; means to fixedly dispose said swinging arms in any one of a plurality of positions to dispose said rasping means in any one of a plurality of positions below the outlet end of said conveyor, said rasping means being of a size to extend substantially across the width of the outlet; deflecting means fixedly positioned at the outlet of the conveyor and at a downwardly facing angle, said deflecting means being positioned such that the lower edge thereof nearly touches the outer ends of said radially extending fingers, and the face of said deflecting means lying in a plane about radially disposed with respect to the axis of said rasping means; and means to rapidly rotate the rasping means whereby said fingers are rapidly carried through the path down which lumpy superphosphate falls from the outlet of said conveyor.

2. A rasping and distributing means for fresh superphosphate, comprising: a frame, a moving conveyor mounted on said frame and having an inlet end to receive lumpy superphosphate and an outlet end to deliver lumpy superphosphate to a rasper, the outlet end of said conveyor being disposed at a higher lever than said inlet end; a rapidly moving superphosphate rasping means mounted on said frame and disposed below the outlet end of said conveyor, the frame being pivotally mounted about a vertical axis intersecting the inlet end of the conveyor whereby the rasping and distributing means may be turned to spread the rasped superphosphate throughout a widespread area, said rasping means being of a size to extend across the width of the outlet; means to drive said conveyor and rasping means in such a direction that the travel of the superphosphate across each is in the same direction; and a deflecting means mounted on said frame and positioned at the outlet of the conveyor and at a downwardly facing angle, said deflecting means being positioned such that the lower edge thereof nearly touches the rasping means, and the face of said deflecting means lying in a plane about radially disposed with respect to the axis of said rasping means, and said deflecting means cooperating with the rasping means to effect a slicing up of the larger lumps of superphosphate material.

3. In a device for rasping and distributing lumps of fresh superphosphate the combination of a frame, a power driven rasper mounted in said frame to rotate about a substantially horizontal axis, a breaker blade, and conveyor means mounted on said frame and positioned to load the superphosphate into the rasper, said rasper being positioned below and at least partially beyond the discharge end of said conveyor means, said rasper being of a size to extend substantially across the outlet end of said conveyor means and including a plurality of projecting arms mounted to rotate in a given direction about a common axis and forming pocket-like openings therebetween, said means being adapted to discharge superphosphate onto an upper portion of said rasper where at least a portion thereof is caught in said pocket-like openings, said breaker blade being mounted to the frame with an edge thereof a relatively close distance to the orbit of the ends of the arms, said blade edge being positioned along the portion of said orbit just following, with respect to the direction of rotation, the area in which said loading takes place and before gravity or centrifugal force has acted to remove the superphosphate from said pocket-like openings whereby the lumps of superphosphate trapped in said pocket-like openings will, if said lumps project from said pocket-like openings in excess of said distance, be reduced in size by the opposing action of the rotating arms and the blade, said rasper means being rotated at a fairly high peripheral speed whereby said arms will tend to have a fracturing effect upon said lumps even though the lumps are not sufficiently large to so project and whereby the superphosphate will be thrown therefrom by centrifugal force and gravity subsequent to passing the blade, said frame including means whereby the device may be pivoted about a given vertical axis along which axis the superphosphate is forwarded to said device, said conveyor means including a moving belt conveyor with the discharge end thereof raised above said rasper and the receiving end positioned to intersect said axis to receive the superphosphate despite any pivotal movements of the frame about said axis.

4. A rasping and distributing means for fresh superphosphate, comprising: a frame, a moving conveyor mounted on said frame and having an inlet end to receive lumpy superphosphate and an outlet end to deliver lumpy superphosphate to a rasper, the outlet end of said conveyor being disposed at a higher level than said inlet end; a rapidly moving superphosphate rasping means mounted on said frame and disposed below the outlet end of said conveyor, the frame being pivotally mounted about a vertical axis intersecting the inlet end of the conveyor whereby the rasping and distributing means may be turned to spread the rasped superphosphate throughout a widespread area, said rasping means being of a size to extend across the width of the outlet; means to drive said conveyor and rasping means in such a direction that the travel of the superphosphate across each is in the same direction; and a deflecting means mounted on said frame and positioned at the outlet of the conveyor to direct the superphosphate from the conveyor to the rasper.

5. A rasping and distributing means for fresh superphosphate, comprising: a conveyor mounted on a frame and having an inlet end to receive superphosphate and an outlet end to deliver superphosphate to a rasper, the frame being pivotally mounted about a vertical axis intersecting the inlet end of the conveyor whereby the rasping and distributing means may be turned to spread the rasped superphosphate throughout a widespread area; a pair of swinging arms mounted on the frame at the outlet end of said conveyor; a rasping means taking the form of a plurality of radially extending fingers, said rasping means being carried on an axle supported at each end in the free ends of said pair of swinging arms; means to fixedly dispose said swinging arms in any one of a plurality of positions to dispose said rasping means in any one of a plurality of positions below the outlet end of said conveyor, said rasping means being of a size to extend substantially across the width of the outlet; deflecting means fixedly positioned at the outlet of the conveyor and at a downwardly facing angle, said deflecting means being positioned such that the lower edge thereof nearly touches the outer ends of said radially extending fingers, and the face of said deflecting means lying in a plane about radially disposed with respect to the axis of said rasping means; and means to rapidly rotate the rasping means whereby said fingers are rapidly carried through the path down which lumpy superphosphate falls from the outlet of said conveyor.

HERMAN B. SIEMS.

REFERENCES CITED

The following references are of record in the file of this patent:

UNITED STATES PATENTS

| Number | Name | Date |
| --- | --- | --- |
| 340,999 | Graves | May 4, 1886 |
| 527,412 | Coxe | Oct. 16, 1894 |
| 593,005 | Wilder | Nov. 2, 1897 |
| 855,745 | Argall | June 4, 1907 |
| 930,137 | Bloom | Aug. 3, 1909 |
| 1,044,547 | Liggett | Nov. 19, 1912 |
| 1,071,237 | Jeffries | Aug. 26, 1913 |
| 1,160,632 | Manley | Nov. 16, 1915 |
| 1,289,542 | Rapp | Dec. 31, 1918 |
| 1,401,527 | Doyle | Dec. 27, 1921 |
| 1,457,210 | Crane | May 29, 1923 |
| 1,975,406 | Reschke | Oct. 2, 1934 |
| 2,013,502 | Phillips | Sept. 3, 1935 |
| 2,063,431 | Grayson | Dec. 8, 1936 |
| 2,092,102 | Wilson | Sept. 7, 1937 |
| 2,105,764 | Feight | Jan. 18, 1938 |
| 2,110,851 | Symons | Mar. 8, 1938 |
| 2,148,209 | Loiseau | Feb. 21, 1939 |
| 2,212,482 | Sheldon | Aug. 20, 1940 |

FOREIGN PATENTS

| Number | Country | Date |
| --- | --- | --- |
| 423,995 | France | Mar. 2, 1911 |
| 500,788 | Germany | June 26, 1930 |
| 671,813 | Germany | Feb. 15, 1939 |